G. H. FERRALL.
CHEMICAL FIRE EXTINGUISHER.
APPLICATION FILED APR. 13, 1916.
1,232,907.
Patented July 10, 1917.
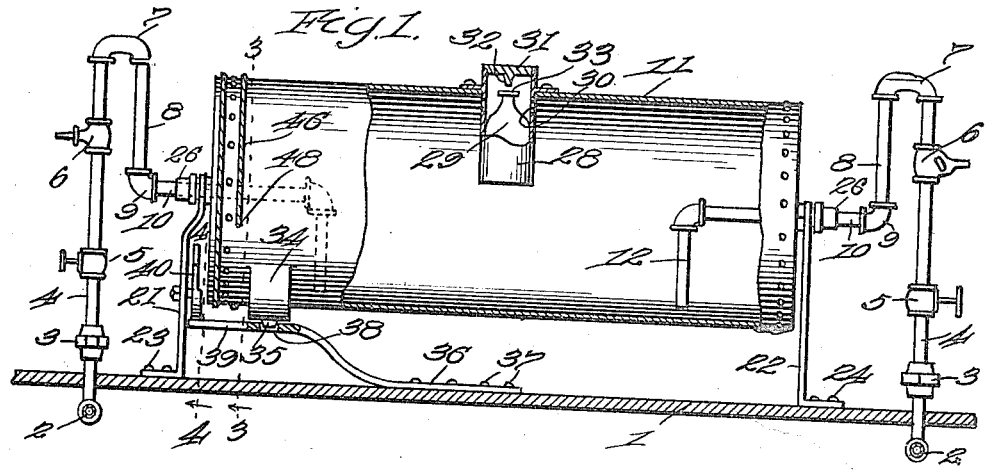
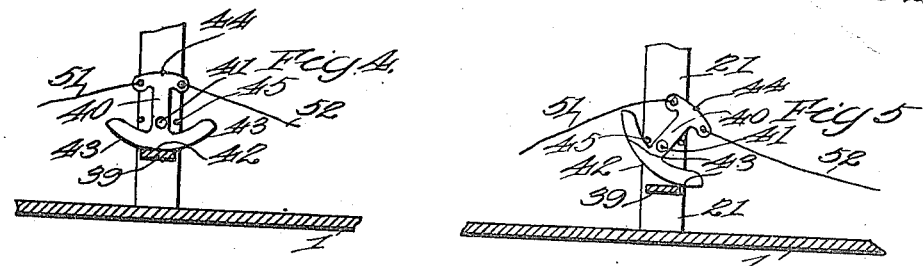
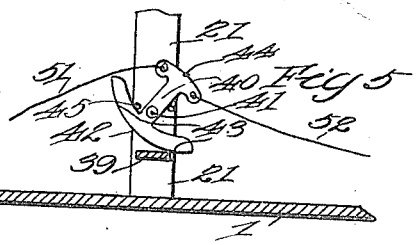
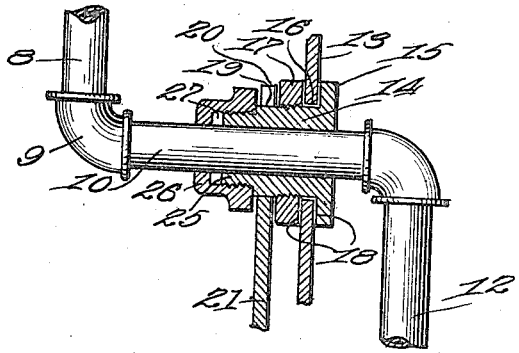
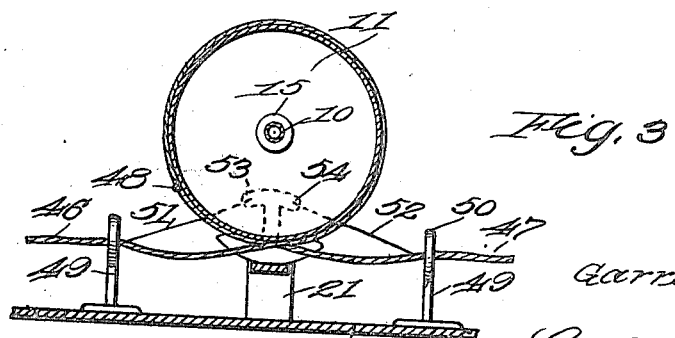
Inventor
Garrett H. Ferrall
By Carl M. Crawford
Attorney

UNITED STATES PATENT OFFICE.

GARRETT H. FERRALL, OF SPOKANE, WASHINGTON.

CHEMICAL FIRE-EXTINGUISHER.

1,232,907. Specification of Letters Patent. Patented July 10, 1917.

Application filed April 13, 1916. Serial No. 90,986.

*To all whom it may concern:*

Be it known that I, GARRETT H. FERRALL, a citizen of the United States, residing at Spokane, in the county of Spokane and State of Washington, have invented certain new and useful Improvements in Chemical Fire-Extinguishers, of which the following is a specification.

This invention relates to improvements in fire extinguishers and has to do more particularly with that type of extinguisher employing an invertible tank, the latter communicating with an acid container in such a manner as to effect mixture of the chemicals in the tank and container when the former is inverted.

This invention has to do with a novel form of mounting the tank in such a manner as to provide for effective bearing therefor, and the invention also relates to an improved mechanism for locking the tank, said mechanism also providing for release of the tank when the same is actuated to be inverted.

More particularly speaking, my invention includes discharge pipes which lead from the interior of the tank and outwardly therefrom for discharge of the contents through said pipes, packing box devices embracing the pipes and being fixed to the tank to rotate with the latter around the pipes. In order to rotatively support the tank, supporting bearings are provided which engage the packing box devices to support the tank.
My invention will be more fully described in connection with the accompanying drawing and will be more particularly pointed out in and by the appended claims.

In the drawing:—
Figure 1 is a view in side elevation, partly broken away, showing one form of the device of my invention.

Fig. 2 is an enlarged sectional view illustrating the manner of mounting the tank on one of the discharge pipes.

Fig. 3 is a sectional view on line 3—3 of Fig. 1.

Fig. 4 is a sectional view on line 4—4 of Fig. 1, showing the device in a tank locking position.

Fig. 5 is a view similar to Fig. 4, with the parts in a tank unlocking position.

Like characters of reference designate similar parts throughout the different figures of the drawing.

The device of my invention is particularly designed for a threshing machine and in the particular embodiment illustrated, I have shown the top of a threshing machine as indicated at 1. Extending lengthwise of the interior of the threshing machine are perforated pipes 2, the terminal ends of which extend up through the top 1 of the machine where they are connected by unions or couplings 3. Said couplings are connected with fixed pipes 4 preferably having cut-off valves 5 interposed therein. I also provide the fixed pipes 4 with discharge cocks 6 which may be connected with suitable lengths of hose when it is desired to extinguish blaze on the exterior of the threshing machine. Elbows 7 connect the pipes 6 with downwardly extending pipes 8, the latter being connected by angles 9 with journal section portions 10, the latter extending into the tank 11. Interiorly of the tank 11, the sections 10 are extended downwardly as indicated at 12, to a point near the bottom of the tank.

It will thus be seen that these fixed pipes function as draw-off pipes which lead from the interior of the tank and extend thereto in a manner to draw off the pressure contents of the tank.

The ends or heads 13, of the tank 11, before being riveted to the body of the tank, are equipped with packing box devices which I will now describe in detail. Referring more particularly to Fig. 2, 14 designates a bearing bushing, preferably of brass, which is provided with a flange 15. Said bushing snugly fits an opening 16 formed in the head 13 and is threaded to receive a nut 17, preferably of brass. The nut 17 is turned up tightly and the parts are sweat on the head 13 so as to be tightly secured thereto, in fact, I am able to provide a pressure proof pipe joint. Any form of gasket, as indicated at 18, may be employed if desired. The bearing bushing 14, outside the nut 17, is provided with a smooth peripheral portion 19 which is adapted to seat in the open top 20, of a supporting bearing 21, for one end, another supporting bearing 22, being provided for the other end. Said supporting bearings are anchored to the top 1, as indicated at 23 and 24. The upper ends of the bearings are bifurcated to receive the bushings 14, it being understood that when the couplings 3 are connected in place, the bushings 14 will be held seated in their bearings. This I consider an important feature of my invention.

The terminal ends of said bushings 14 are reduced and threaded, as indicated at 25, to form one member of a packing gland, the other member being in the form of a cup 26 adapted to be threaded onto the terminal 25. Suitable packing may be disposed in the space 27 so as to provide a liquid tight joint embracing the pipe section 10. Furthermore, the packing engages the pipe with sufficient friction to function as a breaking means to retard accidental rotation of the tank when the latter is released from its locking means.

It will now be seen that the tank is journaled directly on the discharge pipe sections 10, the latter being fixed or rigid, and that the tank is rotatively supported by the bearings 21 and 22.

I have shown the tank provided with a pocket 28 in which an acid containing bottle 29 is disposed. The pocket 28 is provided with openings 30 for egress of the acid into the tank 11. The top of the pocket or receptacle 28 is provided with a cover 31 having a stopper retaining projection 32 for preventing the stopper 33 from entirely becoming disengaged from the bottle or container 29 when the parts are inverted.

A further novel feature of my invention relates to improved locking and releasing means which I will now describe in detail.

On the bottom of the tank 11, I provide a rounded enlargement 34, having a locking stud 35, forming one member of a locking device. The other member of said device comprises a strap spring, as illustrated, said spring having one end 36 anchored at 37, to the top 1, and being provided with an opening 38 to receive the stud 35 and hold the tank against accidental rotation. The spring locking member is tempered to normally assume the position shown in Fig. 1. Said spring member is of sufficient length to extend beyond the stud 35, as indicated at 39. I provide on support 21, a double cam member 40 which is pivoted at 41 to move in a vertical plane. Said cam member is provided with a neutral portion 42 and with actuating portions 43, all of said portions being preferably struck from a center 44 and being eccentric with respect to the pivot 41. Stops 45 serve to limit movement of the cam member in either direction so that said member will never become entirely disengaged from 39. When the parts are in the position shown in Fig. 4, the extension 39 will engage the neutral portion 42 and the latter will be of such height as to permit the spring to engage the stud 35 and hold the tank in a locked position. However, when the cam member 40 is swung to the position shown in Fig. 5, the extension 39 will be depressed in a manner to free the same from engagement with stud 35.

I will next describe the manner in which the tank is inverted, and if desired, agitated, a particular point of novelty consisting in a connection whereby the tank locking means will automatically be actuated to release the tank before the latter is inverted.

As illustrated, the tank operating mechanism consists of ropes, cables or the like, as indicated at 46 and 47. One thereof extends about the tank in one direction, as 46, and is anchored to the tank at 48. The other cable extends about the tank in an opposite direction and is anchored in a similar manner. Suitable guides 49 and 50 are provided through which 46 and 47 are respectively extended. Now the particular novelty of this portion of my invention resides in connections 51 and 52, which may be spliced or otherwise united with 46 and 47, respectively, the opposite ends being connected at 53 and 54 with the cam member 40. Connections 51 and 52 are normally substantially taut, while 46 and 47 are slack. Thus when 46, for instance, is drawn taut, the cam member 40 will first be actuated to depress the extension 39 and free stud 35 before 46 actuates the tank to rotate the same. It will be understood that fires and explosions in threshing machines are of such an instantaneous character that it is necessary for the operator to very quickly turn on the chemical, and therefore, there is no time available for unlocking the tank. In cases where it is desired to slightly oscillate the tank, the connections or cables 46 and 47 may alternately be pulled.

It will be understood that devices of this character must be very cheaply constructed, and it is also necessary in the application of such a device to a portable machine, to secure the tank very firmly, and at the same time, render the tank readily removable so that it may be cleaned out after each usage.

The couplings 3, and the pipes 2, form means for holding pipes 6, stationary or fixed, thereby functioning to hold the tank in its bearings when the vehicle is being drawn over rough ground. Further, when the couplings are disconnected, the tank and its pipes 6, may be removed from the bearings for cleaning purposes. Thus it is an important feature to have the tank readily removable, and at the same time, firmly held in place in its bearings, especially in view of the fact that the locking mechanism comprising the stud and spring, might otherwise become disconnected.

I do not wish to be limited to the construction shown except for such limitations as the claims may import.

I claim:—

1. In a fire extinguisher, a tank, fixed pipes leading from the interior of said tank for discharge of the contents therefrom, a packing box device embracing the exterior of each pipe and being fixed to said tank to rotate therewith about its respective pipe as a bearing, a supporting journal bearing engaging each packing box device to rotatively support said tank, mechanism connected with said tank to rotate the latter in either of two directions, locking means normally holding said tank against rotation, and a device connected for actuation by said mechanism for releasing said tank from said locking means when said mechanism is actuated to rotate said tank, substantially as described.

2. In a fire extinguisher, a tank, means for supporting said tank for rotation of the latter, mechanism connected with said tank to rotate the latter in either of two directions, locking means normally holding said tank against rotation, and a device connected for automatic actuation by said mechanism for releasing said tank from said locking means when said mechanism is actuated to rotate said tank, substantially as described.

3. In a fire extinguisher for portable vehicles, a tank, open supporting bearings for said tank, packing boxes for said tank seated in said open bearings, and pipes leading from the interior of said tank and extending through said boxes, said pipes being held stationary whereby said boxes will be held seated in said open bearings, substantially as described.

4. In a fire extinguisher for portable vehicles, a tank, tubular journals extending from the interior of said tank outwardly therefrom for discharge of the contents of said tank therethrough, open bearings rotatively supporting said tank by engagement with said journals, and means for holding said pipes stationary to prevent said journals from jumping out of said bearings, substantially as described.

5. In a fire extinguisher for portable vehicles, a tank, tubular journals rotatable with respect to said tank and extending from the interior thereof outwardly with respect thereto for discharge of the contents of said tank, open bearings rotatively supporting said tank, and means holding said pipes stationary to prevent said tank from being jarred loose from said bearings or serving to release said pipes to permit the tank to be removed from said bearings, substantially as described.

6. In a fire extinguisher for portable vehicles, a tank, means rotatively supporting said tank, means for locking said tank against rotation, and actuating mechanism connected with said tank for oscillating the latter and operatively connected with said locking means to release said tank prior to actuation thereof by said mechanism, substantially as described.

7. In a fire extinguisher, upright bearing supports, a tank having an outlet and being journaled on said supports for rotation and being provided with a locking stud, a spring locking member normally engaging said stud to prevent rotation of said tank, a cam member pivoted on one of said supports and having a cam provided with neutral and throwout portions for engagement with said locking member, and mechanism for synchronously rotating said tank and operating said cam member, substantially as described.

In testimony that I claim the foregoing as my own, I hereby affix my signature.

GARRETT H. FERRALL.

Copies of this patent may be obtained for five cents each, by addressing the "Commissioner of Patents, Washington, D. C."